United States Patent [19] [11] 3,714,635
Hamilton et al. [45] Jan. 30, 1973

[54] STANDARD ADAPTER METHOD AND APPARATUS

[75] Inventors: John Arthur Hamilton; David Robert Hughes; Leo Thomas O'Connor, Jr., all of Raleigh, N.C.

[73] Assignee: International Business Machines Corporation, Armonk, N.Y.

[22] Filed: Jan. 31, 1972

[21] Appl. No.: 222,189

[52] U.S. Cl. ....................340/172.5
[51] Int. Cl. ....................G06f 3/00
[58] Field of Search ....................340/172.5

[56] References Cited

UNITED STATES PATENTS

| | | | |
|---|---|---|---|
| 3,274,561 | 9/1966 | Hallman | 340/172.5 |
| 3,390,379 | 6/1968 | Carlson | 340/172.5 |
| 3,550,133 | 12/1970 | King | 340/172.5 |
| 3,673,576 | 6/1972 | Donaldson | 340/172.5 |
| 3,680,057 | 7/1972 | Blessin | 340/172.5 |

*Primary Examiner*—Gareth D. Shaw
*Assistant Examiner*—Sydney R. Chirlin
*Attorney*—Edward H. Duffield et al.

[57] ABSTRACT

An adapter unit for facilitating communication between a computer and any one of a number of different input/output devices to which the computer may be connected is disclosed. Each adapter unit may be programmed to handle the various control parameters required for any particular input/output device, thus eliminating the necessity of a specifically designed, hard wired adapter unit for each different input and output device.

8 Claims, 7 Drawing Figures

PATENTED JAN 30 1973

3,714,635

STANDARD ADAPTER METHOD AND APPARATUS

BACKGROUND OF THE INVENTION

1. Field of the Invention

This invention relates generally to the field of input/output communications control for a computer. More specifically, it relates to an adapter unit and method for handling communications between any of a variety of input/output devices and a computer.

2. Prior Art

The problem of adapting a high-speed computer to communicate with a wide variety of input/output devices, all of which have different operating speeds and timing characteristics, is not new. A wide variety of adapter units exist for this purpose. In general, the solution to the problem which has been most frequently utilized in the prior art is to provide an individually designed and specially wired adapter unit for each specific device with which the computer will be used. Each adapter unit in the prior art has, therefore, a limited utility which is restricted to the particular device being adapted for communication with the computer.

A wide variety of input/output devices exists. For example, magnetic discs and tapes, punched tapes, high-speed data communication lines, printers, keyboards, card readers, sorters, scanners, cathode ray tube displays, and vocal responder units are but a few of the numerous input/output devices to which a typical computer may be connected. Each of these separate devices has its own operating speed, operating characteristics, communication line requirements, timing functions, and processing ability. Effective use of the high-speed computer requires that interface units for handling all or any of the above devices be attached to the computer to handle the flow of data in and out. An example of such a device is illustrated in U.S. Pat. No. 3,432,813 which describes a "channel" for handling the flow of data to a variety of control units, each unit being connected to a number of input and output devices of a specific type. This points out one of the basic problems solved by the present invention which eliminates the proliferation of specifically designed control units by replacing them with an individual control unit which may be tailored by programming to operate any of the input/output devices.

A specific problem, common in the control of all of the various types of input/output devices, is that each device requires some specific "timeout." That is if, for example, a printer of some specific type is to print a character, the controller must first determine that the printer is operating, is available for use, and is not presently in use. The controller then sends out the signals for the character to be printed and waits for some unique amount of time for the printing operation to be carried out and a confirmation that it has been done is received. The unique "timeout" for each device is different and has, heretofore, required the design of unique hardware in a control unit for each type of device to be operated by the computer or controller.

OBJECTS OF THE INVENTION

In view of the above prior art and problems therein, it is an object of this invention to provide an improved communication adapter unit which may be used with any of the devices with which the computer will communicate.

It is a further object of this invention to improve communication adapter units by eliminating the requirement of specific hardware design in the unit for each type of input/output device.

It is another object of this invention to improve the method of interfacing a variety of input/output devices with a computer.

The foregoing and other objects, features, and advantages of the invention will be apparent from the following more particular description of a preferred embodiment of the invention, as illustrated in the accompanying drawings.

BRIEF DESCRIPTION OF THE DRAWINGS

Turning now to FIG. 1, a block diagram of the general layout of the computer, together with its associated control unit or interface unit, the standard adapter of this invention, and a variety of input/output devices is illustrated for the purpose of showing the general relationship among the units involved. Computer 1 may be any of a number of generally known and commercially available digital data processing units such as the International Business Machines Corporation's System 360 machine as described in U.S. Pat. No. 3,400,371. Any general purpose computer, however, can be utilized since it is communication with the computer which is the subject of this invention, not the computer itself. Interface unit 2 is generally provided by the manufacturer of each computer for the purpose of adapting the computer for communication with input and output devices via control units for each of them. Each specific interface or controller 2 is designed by the manufacturer to meet the internal coding, processing rate, and electrical synchronization requirements of the computer, and further discussion of this unit is not necessary since the invention relates to the adapter unit 3 as it functions to communicate with any of the input/output units 4 and the computer 1 through the interface for controller 2.

Turning now to FIG. 2, a more detailed illustration of an embodiment of the invention is shown. Standard adapter 3 is provided with input and output lines or busses for carrying data flow, timing, and status signals, among others, to and from the individual input/output devices and the controller or interface unit of the CPU 1.

In FIG. 2, one embodiment of standard adapter 3 is illustrated. As embodied, adapter 3 is seen to consist of a series of data registers (which may be simply different fields in a single register of sufficient capacity) together with associated logic circuitry and a binary counter which control the flow of data in to and out of the registers. Binary counter 5 is driven by a clock (not shown for sake of clarity) and provides all of the basic timing sequences used in adapter 3. The frequency of the clock (or oscillator) utilized to drive binary counter 5 is selected depending on the range of timings required for a broad class of input/output devices. For example, with a 12-position binary counter and an oscillator which provides a pulse every 0.5 microseconds, timings can be specified from 0.5 microseconds to 1,024 microseconds within a 0.5 microsecond accuracy. That is, various periods of time measured in increments of 0.5 microseconds can be selected as a count on the binary counter for, at a known oscillator frequency, a specified amount of time will be required for the count to be reached on the binary counter 5. For input/output devices which require timings appreciably longer or shorter than those available from the chosen counter and clock combination, an appropriate oscillator frequency can be selected. Binary counter 5 is loaded by the control unit 2 with a count which will produce the desired time delay for the input/output device which is to be operated when counter 5 is driven by the oscillator until the count decrements to 0. Control unit 2, when directed by CPU 1 to perform a specified operation utilizing a given I/O device, (for example, to print a character on a printer) will select from storage the appropriate parameters for the chosen unit or device which are required to do such an operation, and will load them into the various registers and into the binary counter of the standard adapter 3. In this example, a count required for the proper timing for a print operation would be loaded into the binary counter 5 and, upon counter 5 reaching 0, the action requested would be taken in accordance with the action field contents of the action register 7. Binary counter 5 does not start counting at once upon receipt of the load count from controller 2; counting does not begin until the appropriate start condition parameters loaded into register 6 have been sensed as present in the particular I/O device to be controlled. In effect, the controller must first sense that the I/O unit is ready to perform before the timeout can be started.

Figure 1:
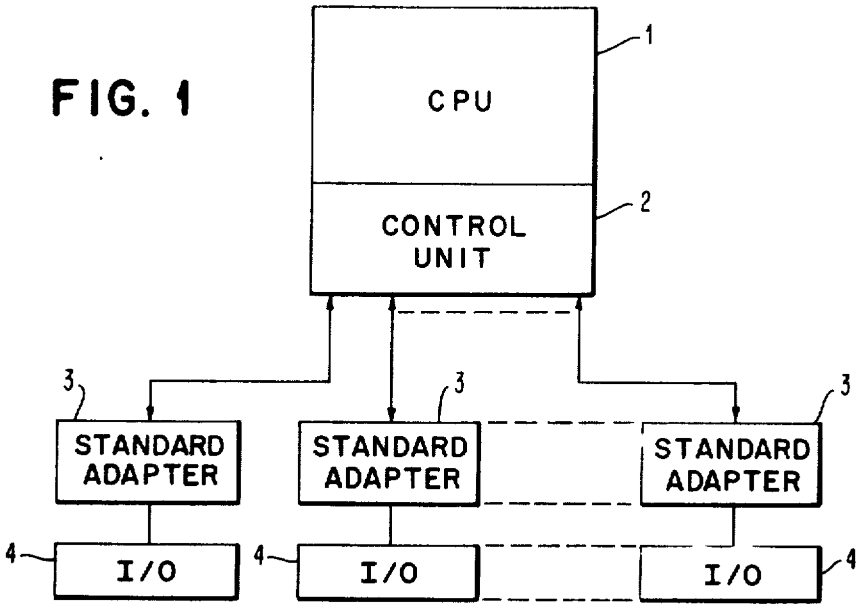
FIG. 1 illustrates the basic arrangement of the invention as it is used in a typical application in connection with a computer and an input or output device (I/O).

Start condition register 6, in addition to containing 1 bit position for each of the input lines from the device to be controlled, contains 2 other bits which are used to determine conditions for starting the binary counter 5. These added two bits are defined as follows:

The Chain bit: The chain bit is used when multiple timeouts are to be "chained" together. Of course, multiple counters and control logic must be provided and the counters must be loaded with the appropriate counts. When this bit is on, its binary counter will start when the counter in the previous segment of adapter 3 has decremented to 0. This will, in effect, chain two timeouts together.

The Inverse Compare bit: The inverse compare bit, when off, will start its binary counter when the prescribed start condition states of the device to be driven are sensed on the input lines to compare with corresponding states loaded into the bit positions in the start condition field of register 6. When this inverse compare bit is on, the start condition is met when the device input lines do not compare with the start condition field. This bit is useful when the present state of the input lines is known, but it is not known what state they will take next and some action must take place if there is any change in the state of the device input lines.

In certain circumstances, there exist requirements for "DON'T CARE" conditions. That is, certain start conditions in the start condition field of register 6 must be masked so that comparison or non-comparison on those bit positions is disregarded as will be discussed later.

The action to be taken, as represented by a code or bit configuration, is loaded into register 7. When the prescribed conditions have been met and the counter has decremented to 0, then the action is taken by gating the code out to the device. The bits in register 7 may represent control signals to the printer to tell it to print and to inform it as to what character should be printed, for example. This register has a field which contains 1 bit for each of the output lines to the device to be controlled and the register is used to change the state of these output lines when the action is to be taken. This field also contains four other bits defined as follows:

The Transmit bit: When this bit is on, the action to be taken when the counter 5 decrements to 0 is to gate the action field bits into the output buffer 8 to change the state of the output lines going to the device to be controlled.

The Receive bit: When this bit is on, the action to be taken is to gate the input lines into the start field of register 6 for subsequent read-out by the control unit 2. This bit would be on, for example, in a reading type of operation in which the device to be controlled is some sort of data input reader.

The Interrupt bit: When this bit is on, as it will be most of the time, the control unit 2 will be interrupted for service to the controlled I/O unit whenever the counter decrements to 0. (For the sake of simplicity, this bit is not illustrated in the figures.)

The Regenerate bit: This bit is optional. In some cases where the same timeout value is used repeatedly, it would be advantageous to force unique hardware to automatically regenerate the counter value in the adapter unit 3 to save effort in loading the conditions each time.

Output buffer 8 has a field which consists of 1 bit for each of the output lines. It always contains the present states of the output lines to the device to be controlled. Interlock mask 9 is used to detect changes in state in the device to be controlled. It is recognized that some of the input lines from a given device do not change often. When things are normal in the device, they may not change at all. However, these lines must be monitored to detect any change in state. Interlock mask 9 is loaded by the control unit 2 with a set of values to be monitored, and whenever there is a change in state, (that is, when the inbound lines do not compare with the mask) the new state is gated to the interlock mask field and the control unit is interrupted. Control unit 2 can then read out the new state of the inbound lines from the interlock mask field.

In operation, the sequence of operations performed by the standard adapter 3 is as follows:

1. The standard adapter 3 receives from control unit 2 its initial starting parameters and other conditions prescribed for the specific unit to be controlled. In the start condition and action field registers 6 and 7, only the bit positions which are to be changed from the previous operation need be loaded.

2. Counter 5 begins when the specified start conditions have been met.

3. The specified action contained in register 7 is carried out upon completion of the countdown by counter 5.

A basic standard adapter unit 3, when viewed as consisting of a counter and several registers (or fields in a single large register), can be thought of in software terms, as an Adapter Control Word which contains enough bits to load the counter and set the proper conditions into registers 6 and 7. If the timing capability of the given combination of a clock and binary counter 5 is not sufficient for the delays encountered in the operation of a given type of I/O device, more than one Adapter Control Word may be utilized. That is, more than one start condition register and binary counter may be used. If the chain bit in the next start condition register 6 is in the on condition as discussed previously, the next counter is started when the first counter decrements to 0. The binary counter field 5 contains a count value that is decremented under the control of an oscillator until it reaches 0 or, alternatively, until it reaches a specified count. The start condition field in register 6 contains the specified value of all of the input lines from the device which must be detected before the counter starts. The action field or register 7 contains the value of all of the output lines to the device that will be loaded into the output buffer 8 upon the completion of the timeout. The interlock mask 9 contains the value of the input interlock lines from the device which must be constantly monitored for change. When a change occurs, the new values are stored for subsequent readout by the controller 2. The output buffer 8 controls the values of all of the output lines to the device.

Figure 3A:
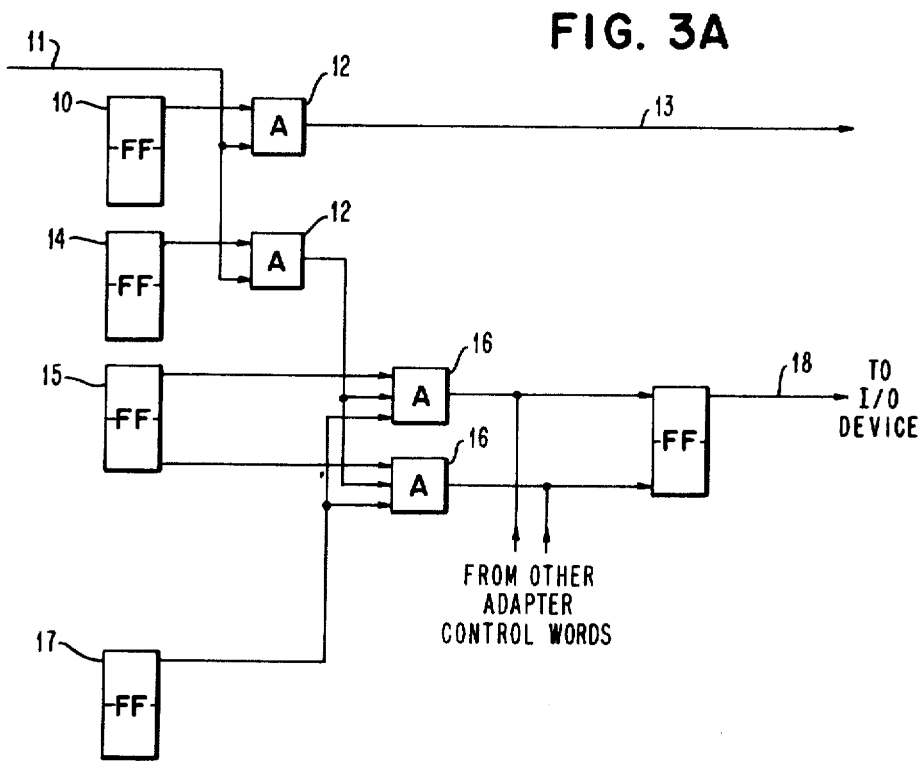
FIG. 3, consisting of parts A and B, illustrates typical control logic circuitry utilized in the embodiment of the invention disclosed.

Turning now to FIG. 3A, a typical single bit position in the action field or register 7 is shown together with the gating of signals to the output buffer and a mask bit for that bit position. The logic circuits are standard and the entire register may be implemented on integrated circuit chips. No gating will take place if the mask bit is off as previously discussed. For purposes of discussion, the Receive bit position 10 and the 0 decode bit from the binary counter 5 (indicated as signal 11) operate together with AND circuit 12 to send a signal to the start field portion of the register 6 over line 13 which, if a signal is sent over it, would gate the conditions of the inbound lines from the I/O device to the start field or register 6 during a reading operation. Similarly, the transmit bit latch 14 would operate through an AND gate 12 in the presence of a decode on line 11 to transmit data to the $n^{th}$ position in the output buffer 18 (part of output buffer 8) and then to the I/O device. This all occurs when the $n^{th}$ position latch 15 enables AND gates 16 with the field mask 17 on.

Figures 2, 3B:
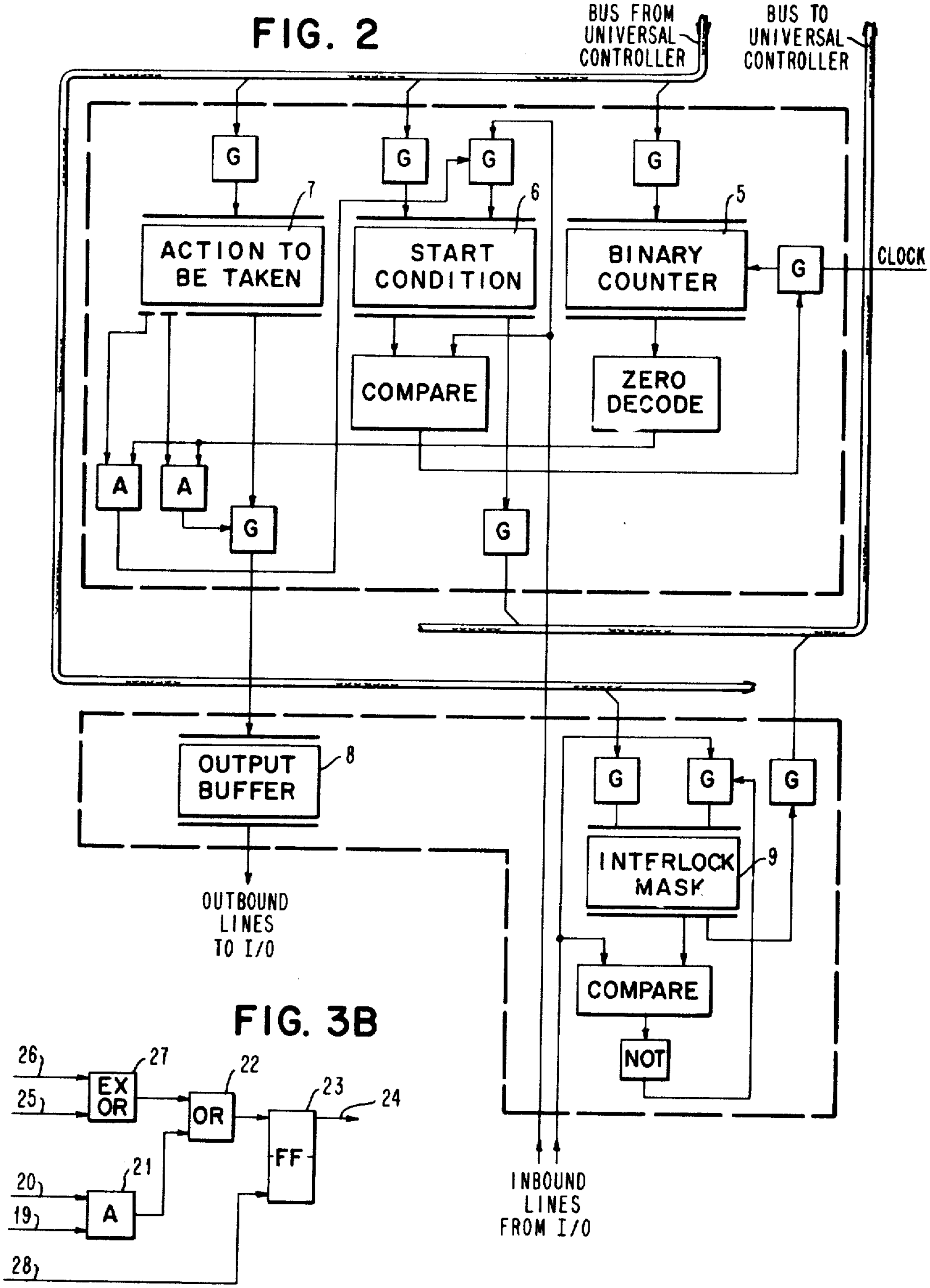
FIG. 2 illustrates, in schematic form, one embodiment of the invention.

FIG. 3B illustrates the binary counter gating for counter 5. The 0 decode on line 19 from a hypothetical previous adapter control word could be used together with a signal of a chain bit being on in the start field of register 6 on line 20 to energize AND gate 21 to start the binary counter through the OR gate 22 and latch 23 over line 24. Alternatively, with the inverse compare bit being on line 25, or with the start field compare signal being present on line 26, Exclusive OR 27 will output a signal to OR gate 22 to output a signal from latch 23 over line 24 to start the counter. In FIG. 3B, the binary counter 5 would be started by one of the following:

1. If the start condition field in register 6 compares with the input lines and the inverse compare bit is off, the counter will be started.

2. If the inverse compare bit is on and the start condition field does not compare with the input lines, the counter will be started.

3. If the chain bit is on in the start condition field and the binary counter in the previous adapter control word has decremented to 0, the counter starts.

Figures 4, 4A:
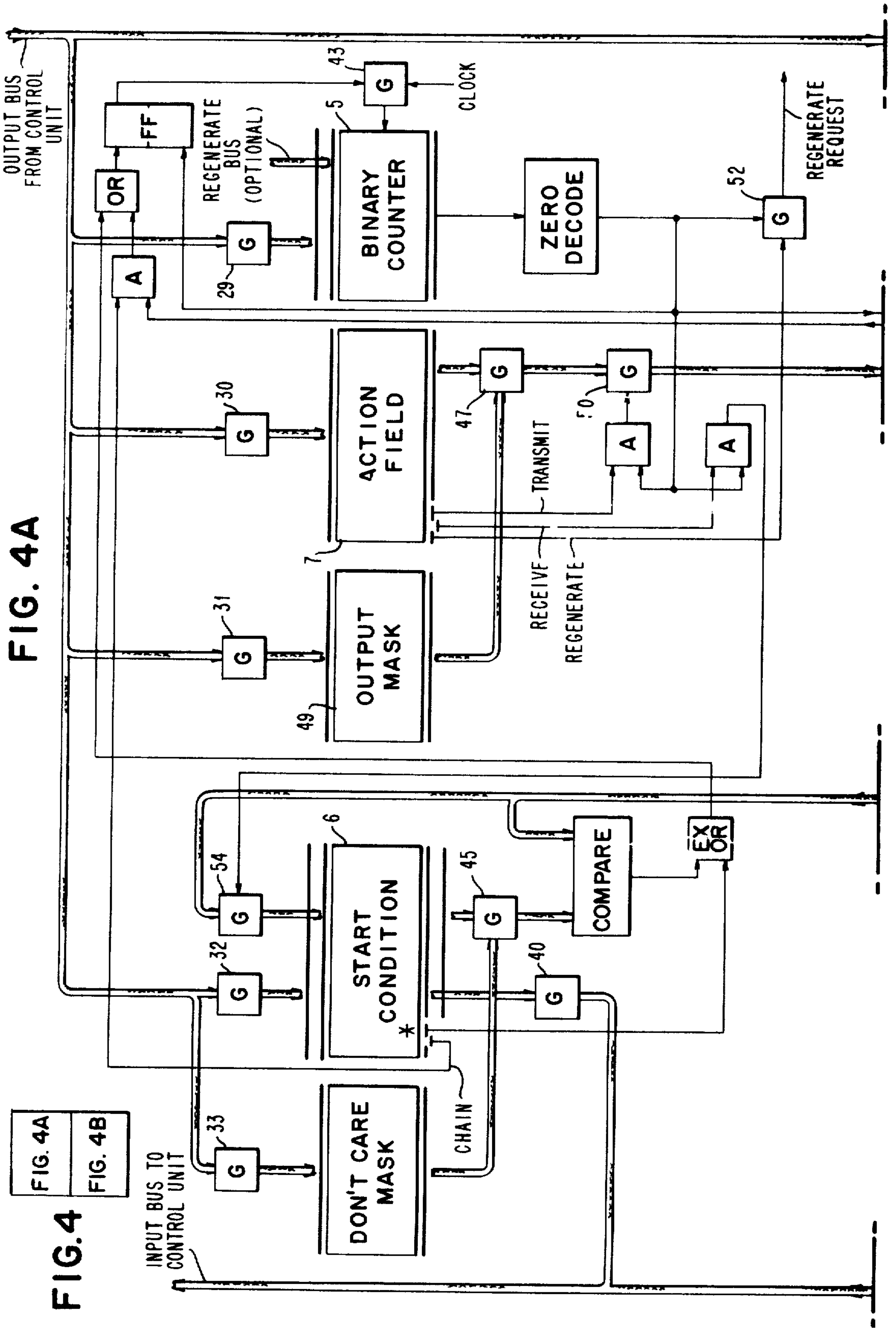
FIG. 4, consisting of parts A and B, illustrates a modification of the embodiment shown in FIG. 2.
Figure 4B:
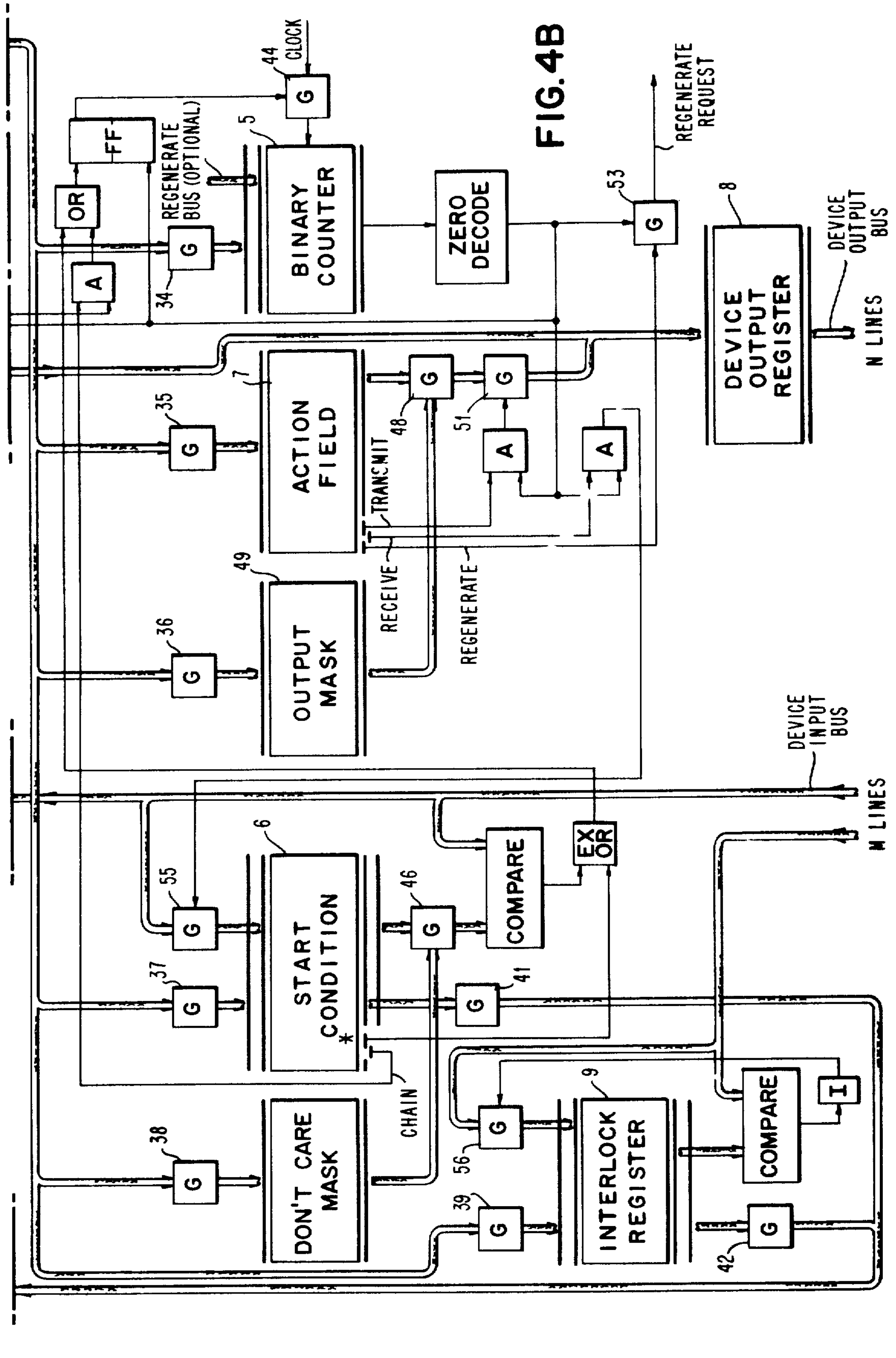

Turning now to FIG. 4, a modification of the invention shown in FIG. 2 is illustrated. FIG. 4 shows the logic and associated circuitry required for connecting two independent adapter control words (or two separate control modules consisting of controls, registers, and circuitry). In this embodiment, gates 29 through 38 are utilized to load output information from the controller 2 to the adapter control words (units). Gate 39 is used for setting up the interlock register or mask 9 which was discussed in connection with FIG. 2. Gates 40 and 41 are utilized in input operations, such as reading operations, to input information to the control unit 2 via the input bus to the control unit. Gate 42 is utilized to input the state of the interlock lines to the control unit 2. Gates 43 and 44 allow the string of pulses from the oscillator or free-running clock to step the binary counters 5. Gates 45 and 46 allow those bits which are not masked by the DON'T CARE mask portion of start condition register 6 (or a field in the register associated with start condition 6) to be compared with the status of the input lines coming from the device to be controlled. Gates 47 and 48 operate in conjunction with the output mask section 49 of the action field or register 7 to allow only the selected or "unmasked" bits that are to be gated to the device to pass on to the output register (or buffer) 8. Gates 50 and 51 are utilized to gate appropriate bits to the device output register 8 in a transmit operation when the binary counter 5 reaches 0. Gates 52 and 53 are used to signal an optional regenerate circuit to reset the binary counter in conditions where multiple identical timeouts or counts are to be provided in sequence. Gates 54 and 55 are utilized, such as in a read operation or receive operation, to gate the device input bus lines to the start field 6 when the binary counter 5 reaches 0. Gate 56 is utilized to allow any new or changed state of the interlock lines from the device input bus to pass into the interlock register. This takes place whenever there is a NO COMPARE in the state of these lines as compared to the original load into the interlock register 9 of the lines which are to be monitored continuously during the operation being performed.

The bit position in the start condition registers (or fields) 6, which is marked by an asterisk, is the inverse compare or the "not" bit. It is utilized to take the action specified in the action field 7 when the input bus lines and the prescribed conditions in the start fields 6 do not compare as previously discussed.

As a generalized example of the mode of operation of the circuit illustrated in FIG. 4, consider the following:

First, the control unit 2 loads appropriate parameters for the device to be operated into all positions of the adapter control word which will be first used. This will provide in the first control word, a specific action to be taken (as represented by a number of 1 or 0 bits in the various positions in the register), a specific time delay after which the action specified is to be taken (as represented by a count loaded into the binary counter 5 which must be decremented to 0), and the specific start conditions which must be sensed before the binary counter 5 is started.

Next, the control unit 2 loads all the positions of any other adapter control word in a fashion similar to that just discussed for the first adapter control word. If the action to be taken in this adapter control word must occur immediately after the action is taken in the previous control word, the chain bit in the start condition field 6 would be set in the on condition and the binary counter 5 would be set to 0. If some specific time delay is required, the binary counter 5 would be given an appropriate count.

Whenever the start condition for the first adapter control word is satisfied, either by a comparison or by a no comparison in the event that the inverse compare bit is on, gate 43 or 44 opens and the binary counter 5 starts to decrement at a rate set by the free running clock.

Wherever binary counter 5 reaches 0, the specific action to be taken as recorded in the action field 7 is outputted through the gate 50 or 51 and/or 52 and 53 and/or 54 and 55. Alternatively, the other binary counter in the next adapter control word can be started via gate 44 if the chain bit in the start condition field 6 of the second adapter control word is on. An alternative action, not shown, is that the control unit could be signaled by the adapter control word that service is requested. (This could be used as the signal that the action to be taken has been completed and that the unit is ready for another instruction.)

Control unit 2 would then load into a control word (which has completed its previous action) the parameters required for the next action to be performed together with the appropriate timing parameters and the start parameters. If the previous action for this control word had been a receive operation, the control unit 2 would read into controller 2 the received state of the device input lines through gate 40 or 41 before reloading the various parameter fields in this control word.

As a simple example of a specific operation to be performed in this circuit, suppose that the control unit 2 is directed by the CPU 1 to perform an operation which requires that a given line on the output bus should be raised (activated) immediately, without regard for the state of the input device or its input lines. This would be done by loading a count of 0 into the binary counter 5 in the available adapter control word, loading the transmit bit position in the action field 7 with a 1 and by loading a 1 in the position in action field 7 corresponding to the particular line to the output device which is to be raised and by loading a mask into the output mask field 49 of register or action field 7 which would mask out all other positions of the action field 7, and by loading the DON'T CARE mask positions in the start condition register 6 to all ones so that regardless of the state of the device input lines, the action will be taken.

As a further simplified example, suppose the control unit 2 is directed to bring up a particular line on the output bus 15 microseconds after another particular line falls on the input bus. The following would take place: the control unit would load a binary count which would produce the desired 15 microsecond delay into the associated binary counter 5; it would load a 1 into the corresponding position in the action field for the line to be brought up and it would load the transmit bit in the action field; it would load a 0 in the position in the start condition field for the line which is required to fall before the action is taken, and it would mask out everything else in the start condition field by loading zeros in the other positions of the DON'T CARE mask portion. The great flexibility and the many applications to which the invention can be put will now be obvious to those of skill in the art. It can easily be seen, for example, that by making the adapter control words (meaning the various fields or registers associated with a given portion of the adapter control unit) modular, and by providing the chaining facility previously discussed, the control unit 2 may be given the capability of alternating between various sections of the standard adapter, alternately loading different modules with tasks to be performed while the other modules are performing their operations. Alternatively, if longer timeout delays are required than the maximum accommodated by the size of binary counter chosen, various binary counters may be chained together as discussed to provide a longer timeout period. It will be appreciated that the standard adapter of this invention is truly universal in that it can be loaded by a program with all of the various parameters necessary to identify and control a specific operation on any particular device, thus eliminating the requirement of specially designed interface adapters for each I/O device to be controlled by the computer/controller system.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An improved method of adapting controllable data input or output devices for control by a computer controller unit, comprising:

loading starting parameters and action control signals for a particular device to be controlled into a storage means for temporarily storing data;

loading a timing parameter for said device into a variable timing means for delaying action in accordance with said timing parameter;

comparing said starting parameter with sensed condition signals from said device to be controlled until a match is found between said parameter and said condition signals;

starting said timing means upon the finding of a match in said comparing step;

operating said timing means until said timing parameter is met; and then outputting said action control signal to said device to be controlled.

2. The method as described in claim 1, wherein:

said operating of said timing means comprises driving a counting means until a count equal to said timing parameter is reached.

3. The method as described in claim 1, wherein:

said operating of said timing means comprises decrementing a counting means loaded with said timing parameter until it is decremented to 0.

4. Software personalized apparatus using an adapter control word for adapting a data input or output device for operation by a controller, said adapter control word comprising a plurality of data bits representing start-up, timing and action parameters for said device;

wherein said apparatus comprises:

means for receiving said adapter control word from said controller and for storing said word;

means for sensing and comparing the condition of said input or output device against a start-up parameter portion of said control word;

means for signalling the comparison of the start-up parameter portion of said control word with said condition of said device; and timing delay means, responsive to said comparison signal, for timing the transmission of the action parameter portion of said control word to said device in accordance with said timing portion of said control word.

5. Apparatus as described in claim 4, wherein:

said means for receiving and storing said adapter control word comprises a plurality of separately addressable registers with gating means for admitting the portions of said control word in to and out of said registers; and said timing delay means comprises a counter means for counting until said timing portion of said control word, as represented by a given count on said counter, is reached together with means in association with said counter for detecting the reaching of said count and for activating said gating means to transmit said action portion of said control word out of its said register to said device to be controlled.

6. Apparatus as described in claim 4, wherein:

said means for receiving and storing said adapter control word comprises a storage register having a plurality of separately addressable fields therein with gating means for admitting portions of said control word in to and out of said fields; and said timing delay means comprises a counter means for counting until said timing portion of said control word, as represented by a given count on said counter, is reached together with means in association with said counter for detecting the reaching of said count and for activating said gating means to transmit said action portion of said control word out of its said register to said device to be controlled.

7. Improved apparatus for adapting a computer to a data input or output device for communication therebetween, wherein said improvement comprises, in combination:

means for storing separately a plurality of groups of data bits representative of control parameters for start-up, action and timing of said device;

sensing and comparison means for sensing the condition of the device to be controlled and for comparing the condition sensed against said start-up parameter and further including comparison signalling means for signalling that a comparison exists;

counter means connected to said comparison signalling means and responsive to said comparison signal for counting at a given rate until said timing parameter, expressed a count on said counter, has been reached;

count complete signalling means connected to said counter for signalling the completion of said count; and gate means responsive to said complete count signal for transmitting for execution the content of said action data portion of said storing means.

8. Improved apparatus for adapting a computer to a data input or output device for communication therebetween, wherein said improvement comprises, in combination:

means for storing separately a plurality of groups of data bits representative of control parameters for start-up, action and timing of said device;

sensing and comparison means for sensing the condition of the device to be controlled and for comparing the condition sensed against said start-up parameter and further including comparison signalling means for signalling that a comparison exists;

counter means connected to said comparison signalling means and responsive to said comparison signal for decrementing a count starting at a count equal to said timing parameter and decrementing until said count equals 0;

count complete signalling means connected to said counter for signalling the completion of said count; and gate means responsive to said complete count signal for transmitting for execution the content of said action data portion of said storing means.

* * * * *